W. B. EICHHOLTZ & F. L. WINTERS.
CAR SIGNAL.
APPLICATION FILED JUNE 19, 1912. RENEWED JAN. 5, 1915.
1,134,827.
Patented Apr. 6, 1915.
2 SHEETS—SHEET 2
Fig. 4.
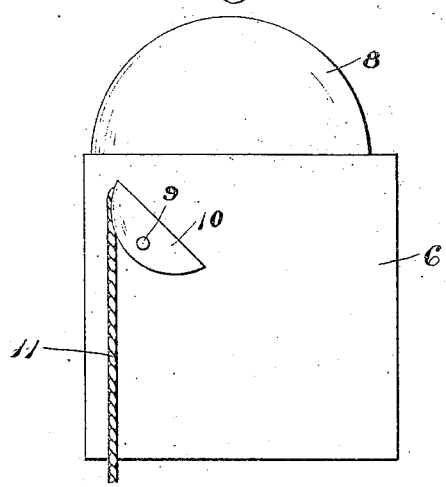
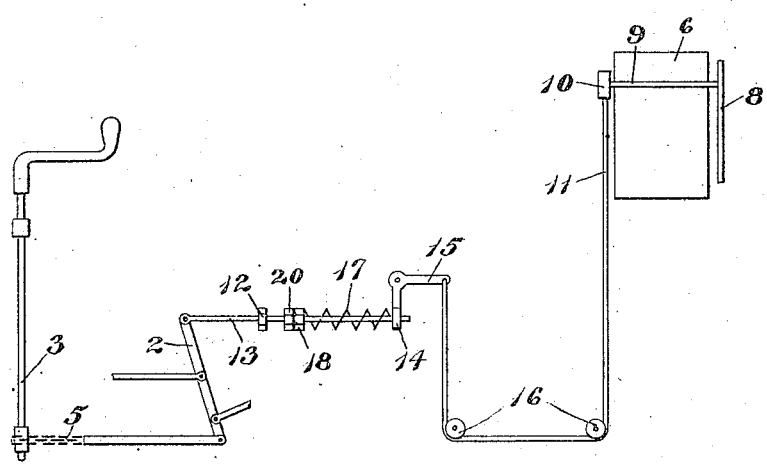
Fig. 5.
Witnesses
G. W. Pierce
C. C. Hines
Inventors
W. B. Eichholtz,
F. L. Winters
By Victor J. Evans
Attorney

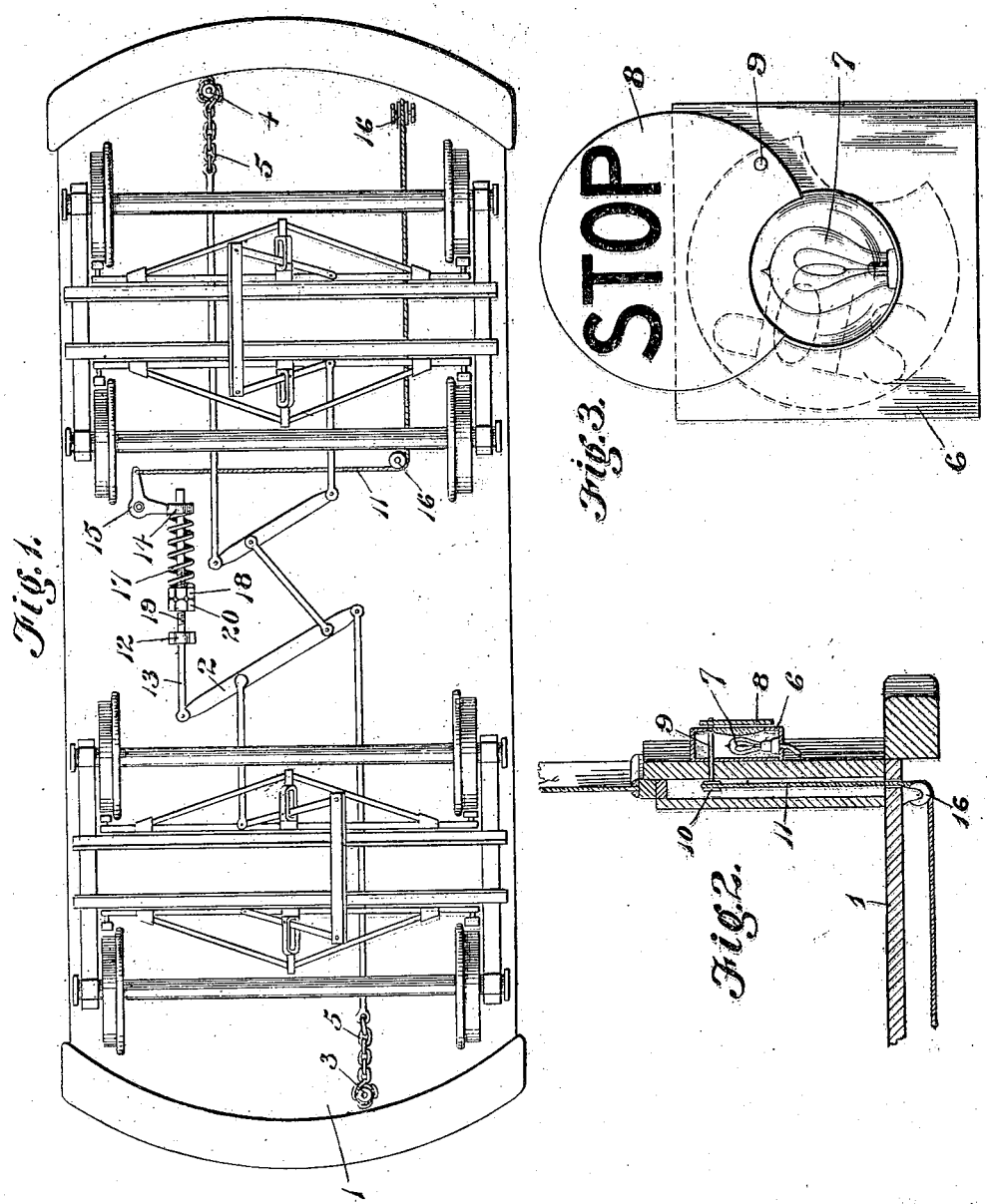

UNITED STATES PATENT OFFICE.

WILLIAM B. EICHHOLTZ AND FERDINAND L. WINTERS, OF NEW ORLEANS, LOUISIANA.

CAR-SIGNAL.

1,134,827.  Specification of Letters Patent.  Patented Apr. 6, 1915.

Application filed June 19, 1912, Serial No. 704,674. Renewed January 5, 1915. Serial No. 700.

*To all whom it may concern:*

Be it known that we, WILLIAM B. EICHHOLTZ and FERDINAND L. WINTERS, citizens of the United States, residing at New Orleans, in the parish of Orleans and State of Louisiana, have invented new and useful Improvements in Car-Signals, of which the following is a specification.

This invention relates to signals for electric railway cars, the main object of the invention being to provide means for displaying a signal at each end of a car to indicate that the car is standing still or about to make a stop, thus giving a warning to the motorman of a following car so as to avoid the possible danger of a rear end collision.

A further object of the invention is to provide a signal of this character which will be controlled by the action of the brake gearing whereby when the brakes are applied to bring the car to a stop or reduce its speed to a material degree, the signal will be automatically displayed.

A still further object of the invention is to provide a signal of the character described, one of which may be arranged at each end of the car, in such manner that the operation of the brake gearing will throw both signals into action, thus indicating both ahead and behind by the display or non-display of the signals that the car is about to stop or will proceed on its way without making a stop.

The invention consists of the features of construction, combination and arrangement of parts hereinafter fully described and claimed, reference being had to the accompanying drawings, in which:—

Figure 1 is a bottom plan view of an electric railway car embodying our invention. Fig. 2 is a vertical section through one end of the car showing the arrangement of the signal proper. Fig. 3 is a front elevation of the signal box showing the signal in normal and display positions. Fig. 4 is a rear elevation of the same. Fig. 5 is a diagrammatic view of the parts of the signal system and coacting parts of the brake gearing.

Referring to the drawings, 1 designates the body of a car, to which the invention is shown applied, 2 the levers of the brake gearing, 3 and 4 the brake staffs at the opposite ends of the car, and 5 the chains or other connections between the brake staffs and the levers.

The car shown is of that type in which a controller and a brake staff are arranged at each end of the car, so that the car may travel with either end forward, but it will, of course, be understood that the invention may be applied to cars of that type which are provided with a motor and brake staff at one end only. These and other modifications, such as the adaptation of the invention to a car actuated by either hand or air brakes, are held to fall within the spirit and scope of my invention.

Arranged at each end of the car is a signal box 6 within which is arranged an electric or other suitable signal lamp 7. This lamp is designed to display a red light for use at night, and may be supplied with current from the lamp circuit of the car in any suitable way. The outer side of the box is open and is adapted to be normally covered or closed by a signal target or sign panel 8 bearing the word "Stop" or other suitable warning or sign matter. Said disk or panel is fixed eccentrically to a shaft 9 journaled in and extending through the box from front to rear thereof and carrying at its rear end a cam pulley or pulley segment 10, to which is fixed one end of an operating chain, cord or wire 11. The signal box shown is arranged in the present instance so as to be prominently displayed at the rear end of the car, and to be controlled by the brake gearing through the operation of either brake staff. When the disk 8 is in normal position the word "Stop" or other sign matter thereon extends vertically. When said disk is projected upwardly to an open or display position, however, the word-sign or symbol thereon is brought to a substantial horizontal indicating position, in which it may be readily read and its purpose determined.

Mounted upon the under side of the car is a guide bracket 12, and slidably mounted in this bracket, at a point intermediate its ends, is a longitudinally extending operating rod 13, which is pivotally connected at one end to one of the brake levers 2. The opposite end of said operating rod is slidable through a guide 14 jointed to one arm of a bell crank lever 15, to the other arm of which is connected the operating cord, wire or cable 11 leading to the cam pulley 10, and which passes around one or more suitable guide pulleys 16. Inclosing the rod between the bell crank lever and the bracket 12 is a coiled buffer spring 17. One end of this spring engages the arm of the bell crank lever to which the rod is jointed, while the opposite end of said spring engages a pitman head or nut 18, engaging a threaded portion 19 of the rod, and held from retrograde rotation by a lock or check nut 20. This spring through its expansible energy, normally holds the brake rod retracted when the brake gearing is in normal or retracted position, and is adapted, when the rod is moved backward by the brake applying motion of the lever 2 with which it is connected, to transmit motion to the bell crank lever 15, whereby said bell crank lever will be operated to draw upon the connection 11 and thus swing the sign target or panel to an open or display position.

Assuming that the parts are in normal position and that the car is running with that end carrying the brake staff 3 ahead, it will be understood that when said staff is operated to materially check the speed of the car or to stop the car, to take on or let off passengers, the resulting motion of the brake gearing will effect a backward motion of the rod 13 against the yielding resistance of the spring 17. This spring will accordingly be compressed to cushion or yieldingly take up all shocks and jars or irregular motions of the rod 13 until its resistance by compression is sufficient to form a substantially rigid connection between the rod and lever 15, whereupon said lever 15 will be moved in the proper position to draw upon the connection 11, thus swinging the panel 8 to open or display position. A signal will thus be displayed at the rear of the car to indicate that its speed has been materially checked or that said car is about to stop or is standing still, enabling the motorman of a following car to check the speed of his car accordingly or to bring it to an immediate stop to avoid a collision. When the brake gearing is released for the retraction of the brakes and returns to normal position, the rod 13 is also returned to normal position, whereby the target disk 8 is closed or again moved to non-displaying position.

When a front signal is used it will lessen danger or head-on collisions on single track roads, as the motorman of a car approaching another may determine whether or not the motorman of the other car is preparing to stop or slow up in time to avoid danger. In double track service a front signal will also be found of advantage, in that a car traveling in one direction and about to stop at a station or crossing in displaying the signal will notify the motorman of a through car approaching the station or crossing from the opposite direction of such fact, enabling him to control his car to prevent him from running down passengers alighting from the first-named car.

It will be understood from the foregoing description that the signal mechanism is operated from either end of the car through the manipulation of either brake staff 3 or 4, so that under emergency conditions the application of the brake at the rear end of the car by the conductor or an authorized person, will also result in the signal being displayed, the warning matter upon the target 2 being shown during the day and the light from the lamp 7 at night. Hence any reasonable number of cars may be run at frequent intervals apart upon single or double tracks, city or interurban lines without liability of head-on or rear end collisions and with less danger of injuring pedestrians or persons getting on or off the cars. It will be understood that the tension of the spring 17 may be regulated at any time by means of the nuts 18 and 20, to take up all slack which may exist in any of the flexible connections, as well as to secure a desired sensitiveness of action of the signal mechanism when the brake gearing is thrown into operation.

The signal mechanism described may be duplicated at each end of the car, so that when the brakes are thrown into action a signal will be displayed at the front end of the car as well as the rear end, to indicate to an approaching car on a single track road that the first named car is standing still or about to make a stop, so that the motorman of the approaching car may determine what course of action to take on approaching a switch or siding, or may be given sufficient warning in order to enable him to bring his car to an immediate stop in the event that both cars are running in opposite directions upon the same track. The display or non-display of the forward signal will also indicate to an intending passenger whether or not the car will make a stop at a usual stopping point, thus avoiding the possibility of an accident to the passenger attempting to board a car in motion.

From the foregoing description, taken in connection with the accompanying drawings, the construction and mode of operation of the invention will be fully understood, and it will be seen that a type of signal mechanism is provided which may be applied to existing car structures, and controlled positively by the operation of the brakes to display one or more signals for the purpose described.

While the construction disclosed is preferred, it will of course, be understood that modifications within the scope of the claim may be made without departing from the spirit of the invention or sacrificing any of the advantages thereof.

We claim:—

In a car signal, the combination with a brake mechanism of a car, including the usual brake lever, of a longitudinally slidable rod pivotally connected with said lever, a bell crank lever having a slotted arm through which the rod loosely extends whereby the said rod is both slidably and pivotally connected, an abutment on the rod, a coiled motion transmitting spring surrounding the rod between the bell crank lever and the abutment, whereby when the brake lever is actuated the rod will be moved to compress the spring and gradually transmit motion therethrough to the bell crank lever, a positively projected gravity retracted signal, adapted for positive projection to display position, and a flexible connection between the other arm of the bell crank lever and said signal, whereby when said bell crank lever is actuated by the pressure of the spring under the motion of the sliding rod said signal will be projected.

In testimony whereof we affix our signatures in presence of two witnesses.

WILLIAM B. EICHHOLTZ.
FERDINAND L. WINTERS.

Witnesses:
H. A. THOMAS, Jr.,
ELIZABETH BRODERICK.